(12) United States Patent
Yaoita (10) Patent No.: US 7,047,745 B1
(45) Date of Patent: May 23, 2006

(54) METHOD FOR OPERATING A HYBRID ENGINE

(76) Inventor: Yasuhito Yaoita, 6-104, 5-21, Haneda, Oota-ku, Tokyo, 144-0043 (JP)

( * ) Notice: Subject to any disclaimer, the term of this patent is extended or adjusted under 35 U.S.C. 154(b) by 13 days.

(21) Appl. No.: 11/036,271

(22) Filed: Jan. 18, 2005

(51) Int. Cl.
 *F01B 21/04* (2006.01)

(52) U.S. Cl. .............................. 60/706; 60/711; 60/712; 60/716; 60/719

(58) Field of Classification Search .................. 60/698, 60/706, 711, 712, 716, 719
See application file for complete search history.

(56) References Cited

U.S. PATENT DOCUMENTS

| 6,362,580 B1* | 3/2002 | Omata et al. ................ 318/139 |
| 6,373,206 B1* | 4/2002 | Morimoto et al. ........... 318/139 |
| 6,390,214 B1* | 5/2002 | Takahashi et al. .......... 180/65.2 |
| 6,408,806 B1* | 6/2002 | Sugiyama et al. ........ 123/90.15 |
| 6,526,947 B1* | 3/2003 | Shimada et al. ............. 123/495 |
| 6,658,852 B1* | 12/2003 | Frey ............................. 60/716 |

FOREIGN PATENT DOCUMENTS

| JP | P2001-152951 A | 6/2001 |
| JP | P2001-159365 A | 6/2001 |
| JP | P2003-301731 A | 10/2003 |

OTHER PUBLICATIONS

Prior Art Search Report in Japanese Patent Application No. 2004-3184798, PATOLIS Inc. Japan.

* cited by examiner

*Primary Examiner*—Hoang Nguyen (57) ABSTRACT

According to a prepared program and the signal from a crank angle sensor, a computer switches two operation modes A and B in which an electric motor operates, and the computer creates a pair or pairs of different operation mode phases during the period from an ignition time to the next ignition time. As a result, the sum of the second period BB of the generating phase B and the first period AA of the succeeding driving phase A is long as compared with a conventional engine. If an initial period in an intake stroke or an exhaust stroke is set within the long period sum, it is possible to reduce intake loss or exhaust loss.

11 Claims, 12 Drawing Sheets

Engine Performance Curve

Fig. 12

METHOD FOR OPERATING A HYBRID ENGINE

BACKGROUND OF THE INVENTION

1. Field of the Invention

The present invention relates to improvements in the intake, exhaust and combustion characteristics of an engine.

2. Description of the Related Art

It has not been possible to vary the time required for a portion of each of the intake, compression, expansion and exhaust strokes of an internal combustion engine with regard to another portion. For that reason, it has not been possible to solve the following five problems about an internal combustion engine. The first to fourth problems occur because a portion of each piston stroke requires a short time. The fifth problem occurs because another portion of each piston stroke requires a long time.

First Problem

Figure 12:
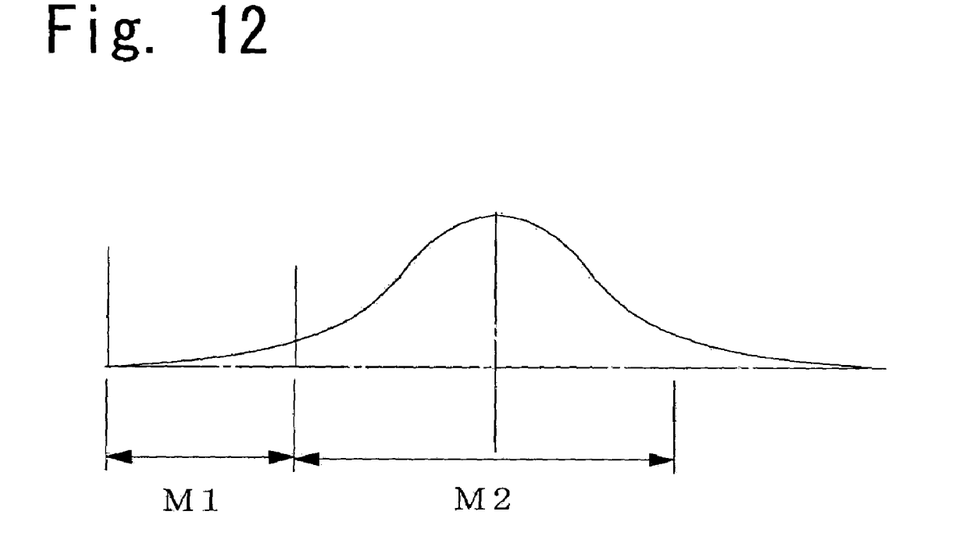
FIG. 12 shows the lift curve of the intake and exhaust valves of a conventional engine.

As shown in FIG. 12, the valve lift is radically smaller during an initial period M1 in each intake stroke than during a middle period M2 of it. As a result, in a four-cycle engine, the amount of gas sucked into each cylinder during the initial period M1 decreases as the engine speed increases. In turn, the pressure in the combustion chamber becomes lower than the pressure in the crankcase. This results in a force acting away from the crankcase toward the combustion chamber. During the initial period M1, the piston continues to move away from the cylinder head against this force. This results in a decrease in torque because of an increase in negative work, as well as an increase of the loss caused by the intake resistance.

Figure 11:
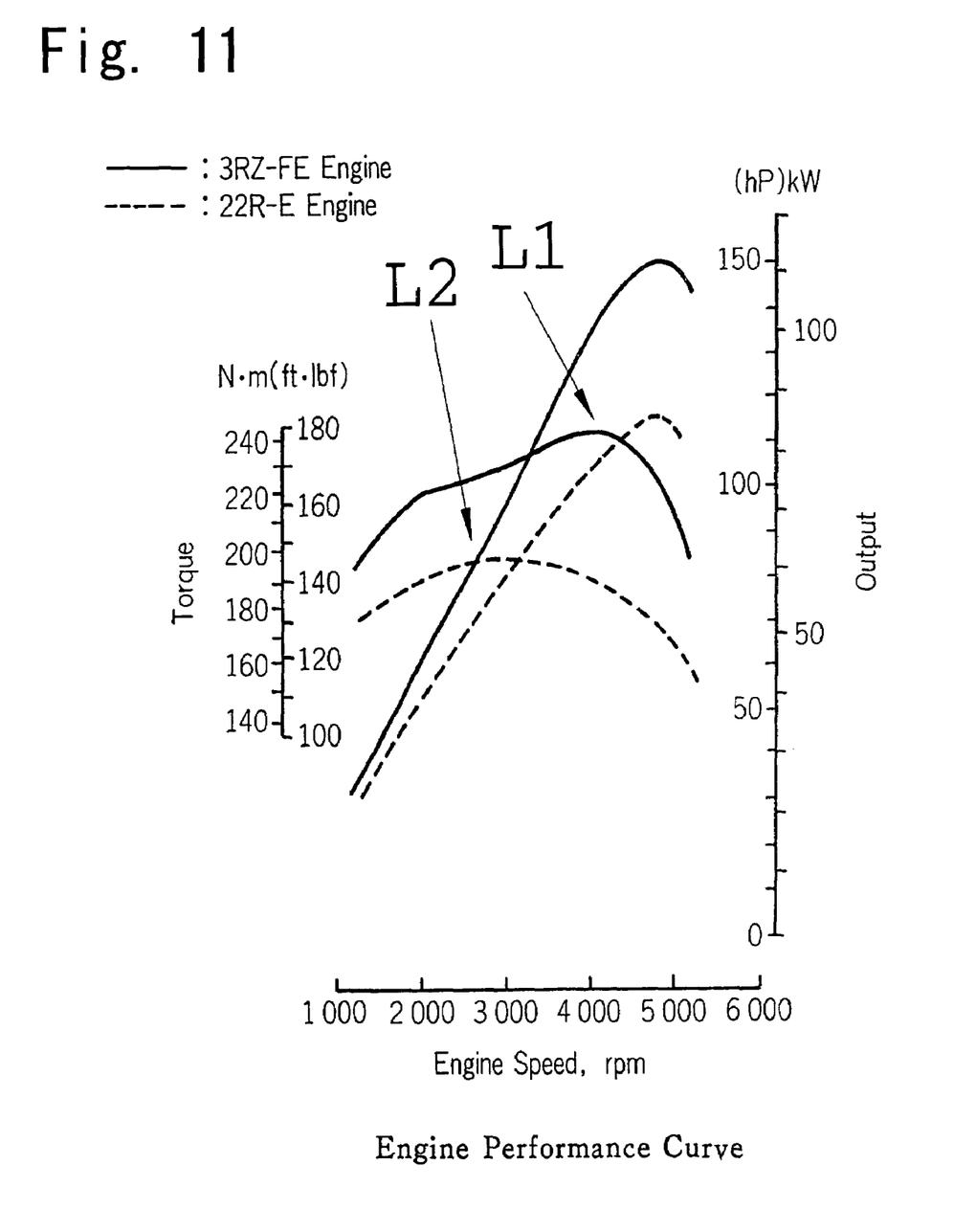
FIG. 11 shows engine performance curves of conventional 3RZ-FE and 22R-E engines.

FIG. 11 of the accompanying drawings is substantially identical with FIG. 1 on page 90 of the November, 1995 (Issue No. 434) issue of a magazine entitled "Internal Combustion Engine" published by Sankaido. FIG. 11 additionally shows the maximum torque points L1 and L2. At engine speeds higher than those at the maximum torque points L1 and L2, the torque is lower than these points. One of the causes of the torque drop is the increased loss caused by the exhaust resistance.

Second Problem

As shown in FIG. 12, the valve lift is radically smaller during an initial period M1 in each exhaust stroke as well than during a middle period M2 of it. As the engine speed increases, the time from opening the exhaust valve until the bottom dead center of the exhaust stroke becomes shorter. This increases the pressure in the cylinder at the bottom dead center, increasing the loss caused by the exhaust resistance after the piston reaches the bottom dead center.

Third Problem

The thermal efficiency is mainly governed by the combustion speed of the mixture and the descending speed of the piston. The descending speed is governed by the combustion speed. Therefore, it has been impossible to slow down only the descending speed. For that reason, it has been impossible to improve the thermal efficiency.

Fourth Problem

In a two-cycle engine, as the engine speed increases, the time from opening the exhaust port to opening the scavenging port becomes shorter. This causes the pressure in the cylinder to be high when a scavenging stroke starts. As the engine speed increases, this reduces the efficiency of scavenging the residual exhaust gas inside the cylinder with the scavenging flow. As a result, the mixture filling rate drops, and the torque decreases.

Fifth Problem

In a spark ignition type internal combustion engine, if the pressure history becomes too high through the combustion in a portion of the combustion chamber, all ends of the flame propagation paths self-ignite at the same time. This destroys the extinguishing layers adjoining the walls of the combustion chamber, so that there is an increase in the heat flowing into the chamber walls. As a result, the chamber walls melt down. Normally, the compression ratio has a low setting so that such knocking does not occur. This restricts the improvement of thermal efficiency.

SUMMARY OF THE INVENTION

According to the present invention, a method is provided for operating a hybrid engine, which includes an internal combustion engine and an electric motor. The output shafts of the internal combustion engine and the motor are connected mechanically together. The motor can be switched electrically between a driving operation mode, in which the motor drives the internal combustion engine, and a generating operation mode, in which the motor generates electric power. The hybrid engine is fitted with a crank angle sensor for sensing the crank angle of the internal combustion engine. The hybrid engine is further fitted with a computer for controlling the electric switching of the motor according to information from the crank angle sensor. The operating method comprises the steps of:

so controlling the motor that the computer creates at least one driving phase and at least one generating phase according to a prepared program and the information from the crank angle sensor during the period from an ignition time to the next ignition time, the driving and generating phases pairing with each other; and so controlling the motor by means of the computer as to keep operating alternately in the driving and generating operation modes during the driving and generating phases, respectively.

BRIEF DESCRIPTION OF THE DRAWINGS

Preferred embodiments of the present invention are shown in the accompanying drawings, in which:

FIG. 2 applies to all the embodiments;

DETAILED DESCRIPTION OF PREFERRED EMBODIMENTS

Figure 1:
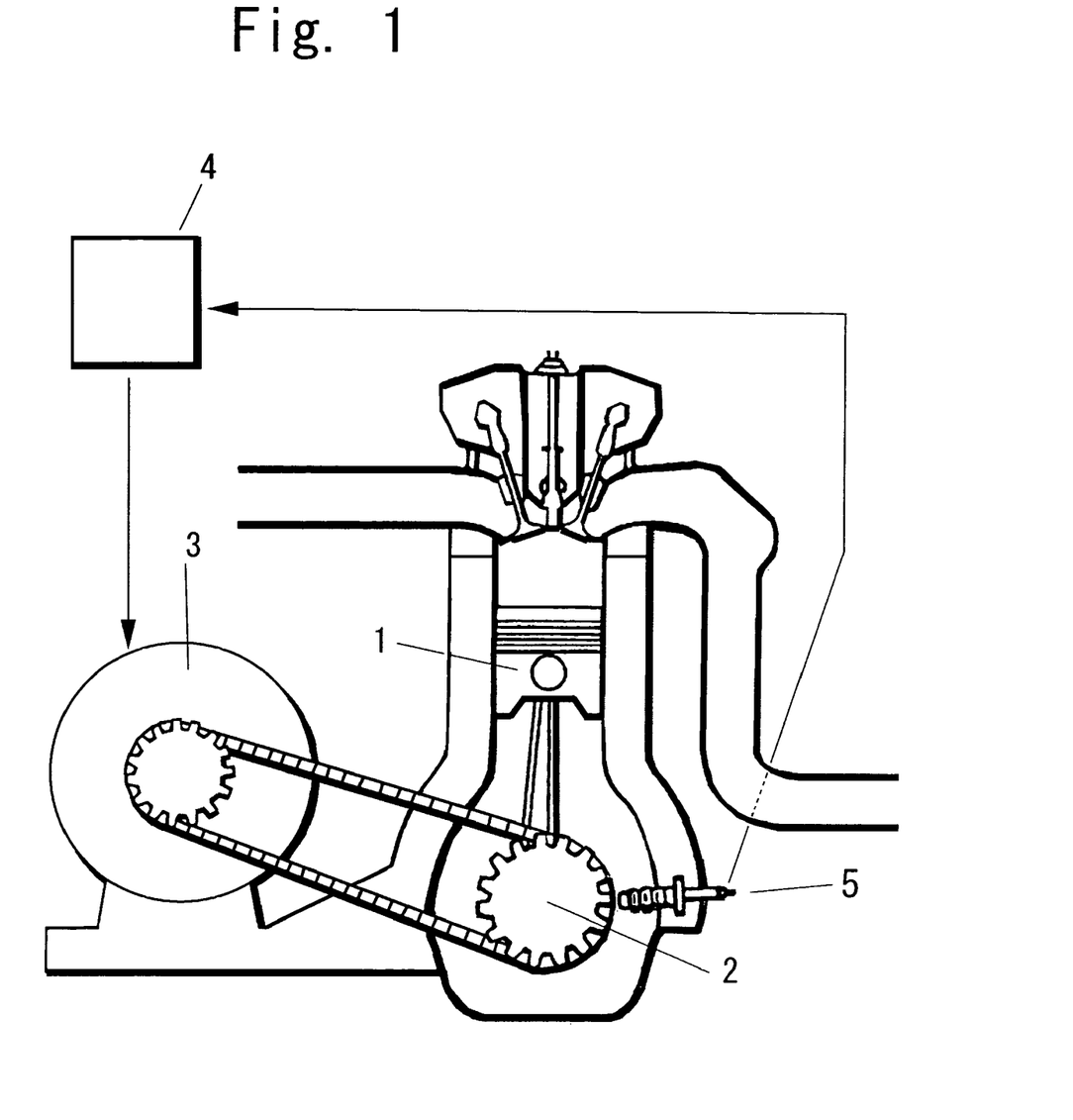
FIG. 1 conceptually shows a hybrid engine, in which the output shafts of an electric motor and an internal combustion engine are connected mechanically.

FIG. 1 shows a hybrid engine to which an operating method embodying the present invention can be applied. The hybrid engine includes an internal combustion engine 1 and an electric motor 3, which functions as both a drive motor and a dynamo. The output shafts of the engine 1 and motor 3 are connected together by a timing belt so that the rotation of the output shaft of the engine 1 is influenced by the switching between the driving operation mode and generating operation mode of the motor 3. The output shafts might be connected by another mechanical means. Alternatively, the crankshaft of the engine 1 might be connected to the output shaft of the motor 3.

Vehicle wheels can be driven by either the internal combustion engine 1 or the electric motor 3. Therefore, the hybrid engine may be of either the parallel type or the series-parallel type. The hybrid engine might be of the series type if the internal combustion engine 1 were connected mechanically to an electric generator that functions as both a drive motor and a dynamo.

The hybrid engine is fitted with a computer 4 for electronically controlling the switching between the driving and generating operation modes of the electric motor 3. The hybrid engine is also fitted with a crank angle sensor 5.

The basic method for operating the electric motor 3 is described below.

Figure 2:
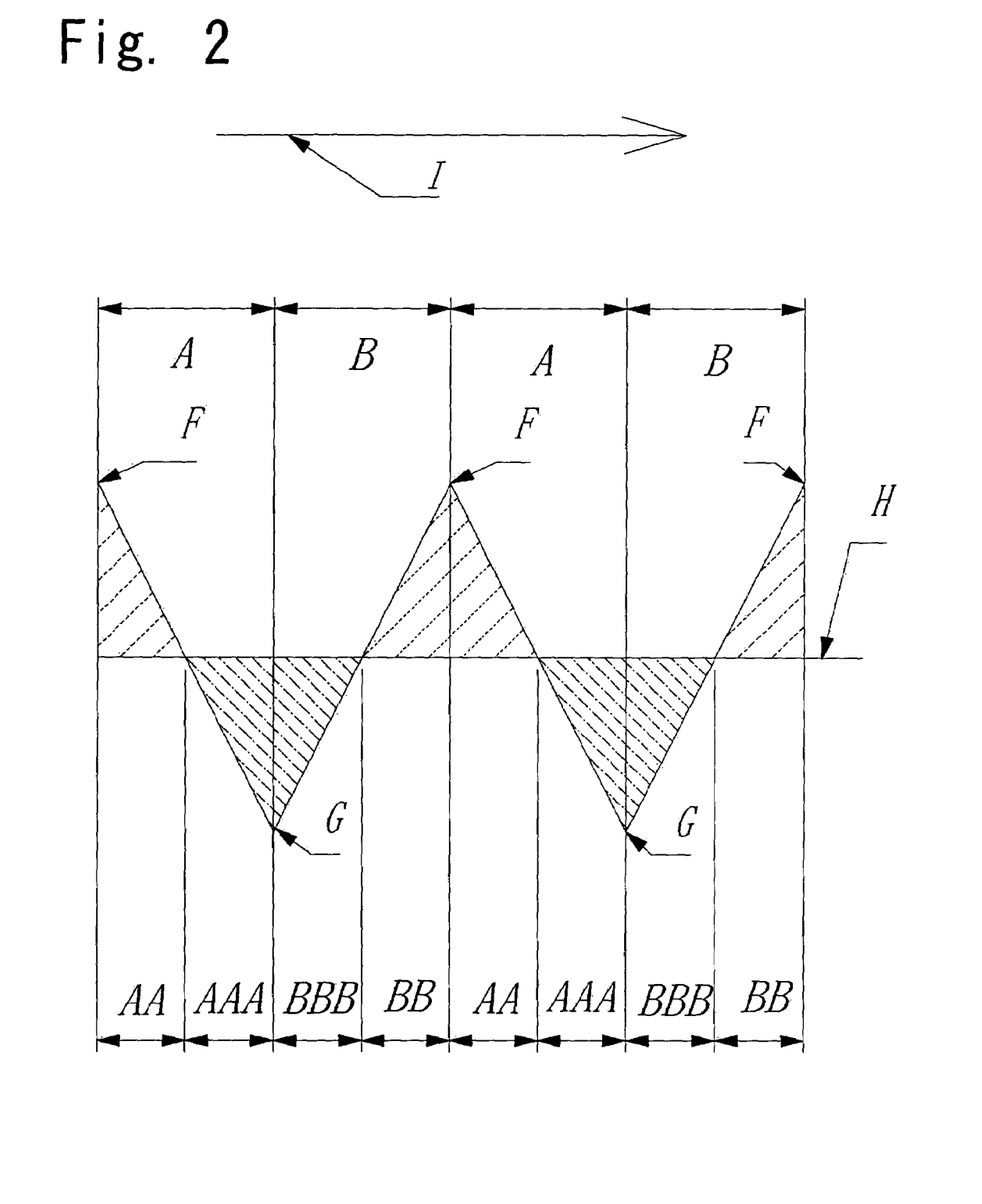
FIG. 2 shows the relationship between a period when the engine operating time is long or short and two types of phase during which the electric motor operates in different modes.

With reference to FIG. 2, during the period from an ignition time to the next ignition time, the computer 4 creates one or more driving phases A and one or more generating phases B according to a prepared program and the signal from the crank angle sensor 5. The driving phases A alternate with the generating phases B. The computer 4 so controls the electric motor 3 as to keep operating alternately in the driving and generating operation modes during the phases A and B, respectively, over engine cycles. Accordingly, the operation mode or modes in which the electric motor 3 has operated during a phase or phases of a piston stroke of an engine cycle can be reproduced at the same timing during the same phases of the other cycles regardless of the number of cylinders. The basic method for operating the electric motor 3 can be applied to an engine having one more cylinders.

If the hybrid engine were of the series type, the electric motor 3 would be used as a dynamo. Therefore, in this case, the lengths of time of the generating phases B should be longer than those of the driving phases A.

While the electric motor 3 is operating in the generating operation mode, the rotational speed of the crank of the internal combustion engine 1 decreases. While the electric motor 3 is operating in the driving operation mode, the rotational speed of the crank increases. This makes it possible to vary the ratio between the lengths of time of two successive phases A and B during which the electric motor 3 has operated in each piston stroke.

In practice, each of the phases A and B is influenced by the operation mode in which the electric motor 3 operates during the preceding phase. This is explained below with reference to FIG. 2, in which the arrow I indicates the passage of time.

FIG. 2 shows a comparison of the lengths of periods in each piston stroke between the conventional internal combustion engine and the hybrid engine, in which the conventional internal combustion engine 1 is connected to the electric motor 3, which also functions as a dynamo. The comparison is made on the basis of the conventional engine, which is represented by the horizontal line H.

Each driving phase A consists of the first period AA and the second period AAA. Each generating phase B consists of the first period BBB and the second period BB.

The crank is accelerated during each driving phase A. The acceleration in the second period AAA of each driving phase A cancels the deceleration effect during the succeeding generating phase B. Accordingly, if the lengths of time of the phases A and B are equal, the first period BBB of each generating phase B is not longer than the time of the horizontal line H. The deceleration effect in the second period BB of each generating phase B does not influence the second period AAA of the succeeding driving phase A. For these reasons, the time of the horizontal line H is longer than the sum of the second period AAA of each driving phase A and the first period BBB of the preceding generating phase B. The period sum is indicated with alternate long and short dash lines spaced at narrow intervals.

The crank is decelerated during each generating phase B. The deceleration in the second period BB of each generating phase B cancels the acceleration effect during the succeeding driving phase A. Accordingly, if the lengths of time of the phases A and B are equal, the first period AA of each driving phase A is not shorter than the time of the horizontal line H. The acceleration effect in the second period AAA of each driving phase A does not influence the second period BB of the succeeding generating phase B. For these reasons, the time of the horizontal line H is shorter than the sum of the second period BB of each generating phase B and the first period AA of the succeeding driving phase A. This period sum is indicated with dotted lines spaced at wide intervals.

The deviation of time from the horizontal line H in FIG. 2 increases with the capacity of the electric motor 3.

The period from an ignition time to the next ignition time varies with the number of cylinders. Accordingly, the sum of the lengths of time of two successive phases A and B, during which the electric motor 3 operates, varies with the number of cylinders. For a four-cycle engine, the length of time of each pair of phases A and B is equivalent to the crank angle of 720 degrees divided by the number of cylinders. For a two-cycle engine, the length of time of each pair of phases A and B is equivalent to the crank angle of 360 degrees divided by the number of cylinders.

The five problems explained in the Background of the Invention can be relieved by the operation of the electric motor 3 through the basic and following methods.

As stated already, the first to fourth problems occur because the length of time for a portion of each piston stroke is short. It is possible to relieve these problems by setting the length of time for this portion within one of the periods that can be longer.

As stated already, the fifth problem occurs because the length of time for another portion in each piston stroke is long. It is possible to relieve this problem by setting the length of time of this portion within one of the periods that can be shorter.

The foregoing methods are described below in more detail as Embodiments 1 to 5, which relieve the first to fifth problems, respectively.

Embodiment 1

In a four-cycle engine, an initial period in each intake stroke in each cylinder starts at the valve-opening time and extends while the valve lift is small. The initial period is set within one of the periods that can be longer than the horizontal line H in FIG. 2. These periods are indicated with the dotted lines, which are spaced widely.

Each of the periods indicated with the widely spaced lines may be equal to each of the periods indicated with the alternate long and short dash lines, which are spaced narrowly. In this case, each of the periods indicated with the widely spaced lines is equivalent to a half of the crank angle of 720 degrees divided by the number of cylinders.

Figure 4:
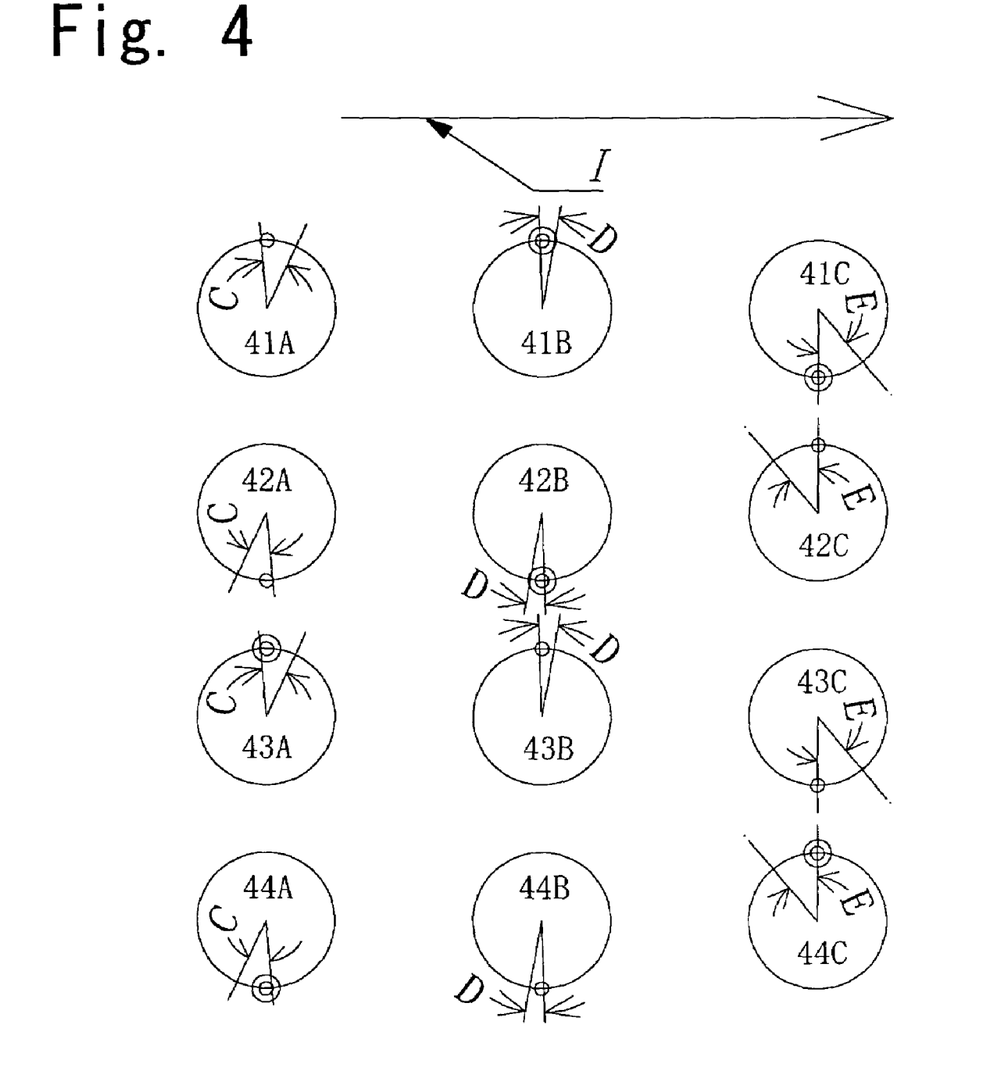
FIG. 4 shows a four-cycle four-cylinder engine.

This embodiment is exemplified by a four-cycle four-cylinder engine with reference to FIG. 4, in which the arrow I indicates the passage of time.

FIG. 4 schematically shows the first to fourth cylinders of the engine in three vertical rows, in each of which the four cylinders are shown as working at the same time.

The single circles at 0 o'clock in FIG. 4 indicate the top dead centers of intake strokes.

The double circles at 0 o'clock in FIG. 4 indicate the top dead centers of compression strokes.

The single circles at 6 o'clock in FIG. 4 indicate the bottom dead centers of intake strokes.

The double circles at 6 o'clock in FIG. 4 indicate the bottom dead centers of exhaust strokes.

It is assumed that the initial period in each intake stroke in each cylinder is equivalent to a crank angle C of 30 degrees between 5 degrees before the associated top dead center and 25 degrees after this center. In a four-cylinder engine, if the driving and generating phases A and B in FIG. 2 are equal in length of time, each of the periods indicated with the widely spaced lines is equivalent to a crank angle of about 90 degrees.

Under the foregoing assumption, if the end point F of each generating phase B is 10 degrees after the top dead center of an intake stroke, the deviation of time along the vertical axis in FIG. 2 is largest. In this case, the time along the vertical axis starts becoming longer at a point of 35 degrees before the top dead center of the intake stroke. This point is 45 degrees, which is a half of the foregoing crank angle of 90 degrees, before 10 degrees after the top dead center. The time along the vertical axis stops becoming longer at a point of 55 degrees after the top dead center of the intake stroke. This point is 45 degrees after 10 degrees after the top dead center.

Function of Embodiment 1

As the power generation by the electric motor 3 progresses, the crank speed decreases, so that the initial period in each intake stroke in each cylinder becomes longer. This raises the pressure in the cylinder at the end point F of the generating phase B as compared with a case where the operating method according to the present invention is not used. This, in turn, reduces the negative work against the pressure from the bottom of the piston as compared with the conventional engine. As a result, the intake loss decreases.

This embodiment can be applied to spark ignition engines and compression ignition engines if they are four-cycle engines.

Additional Description of Embodiment 1

In the four-cylinder engine shown in FIG. 4, the initial period 43B in an intake stroke in the third cylinder occurs during a combustion stroke 41B in the first cylinder. The combustion stroke 41B accelerates the piston in the third cylinder working in the initial period 43B, during which the lift of the intake valve is small. For this reason, in the four-cylinder engine, the function of this embodiment is limited.

The function of this embodiment is also limited in an engine having an even number other than four of cylinders. In a six-cylinder engine, as shown at D of 61B and D of 64B in FIG. 6, the initial period in an intake stroke in the fourth cylinder occurs during a combustion stroke in the first cylinder. In an eight-cylinder engine, as shown at D of 81B and D of 85B in FIG. 8, the initial period in an intake stroke in the fifth cylinder occurs during a combustion stroke in the first cylinder. A similar thing occurs in an engine having another even number of cylinders.

The problem caused by the use of an engine having an even number of cylinders can be solved by the use of an engine having an odd number of cylinders.

Figure 3:
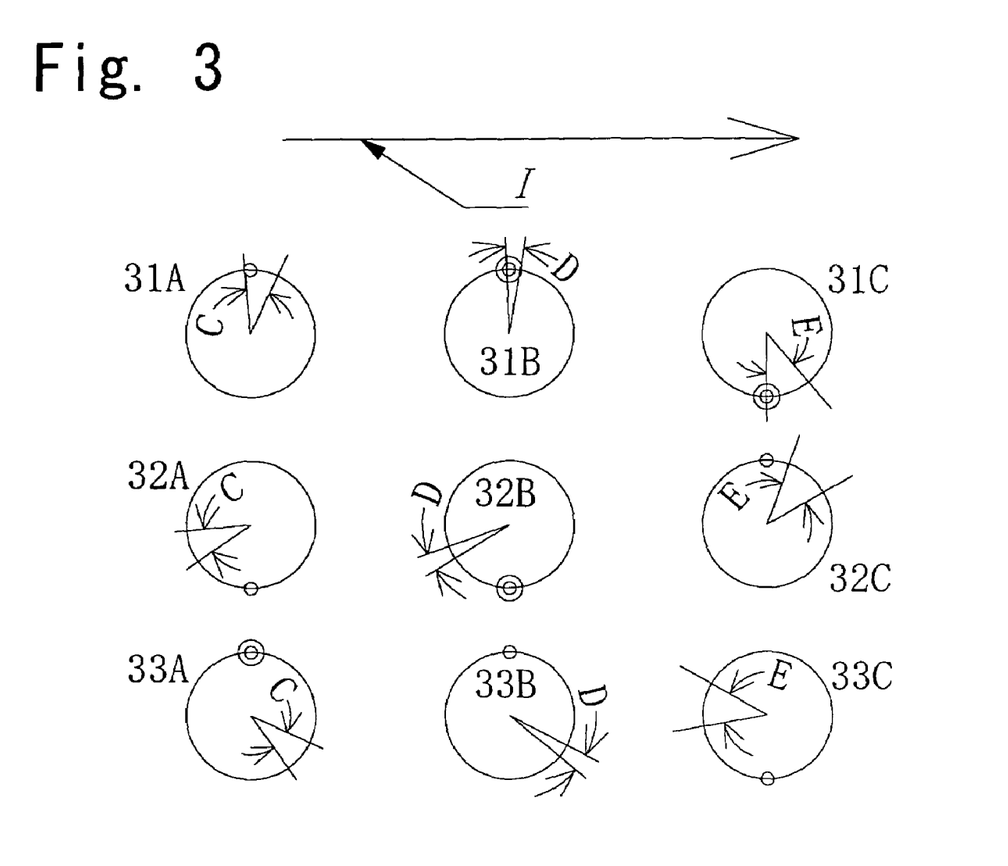
FIG. 3 shows a four-cycle three-cylinder engine; the left row A in FIG. 3 represents Embodiment 1 and indicates the piston strokes in the three cylinders at a time; the middle row B in FIG. 3 represents Embodiments 3 and 5; the right row C in FIG. 3 represents Embodiment 2; the first and second lines of cylinders represent the first and second cylinders, respectively.

In a three-cylinder engine, as shown in FIG. 3, the middle period in an exhaust stroke 32B in the second cylinder and the middle period in an intake stroke 33B in the third cylinder occur during a combustion stroke 31B in the first cylinder. Accordingly, there is no cylinder in which the initial period in an intake stroke overlaps with a combustion stroke.

Figure 5:
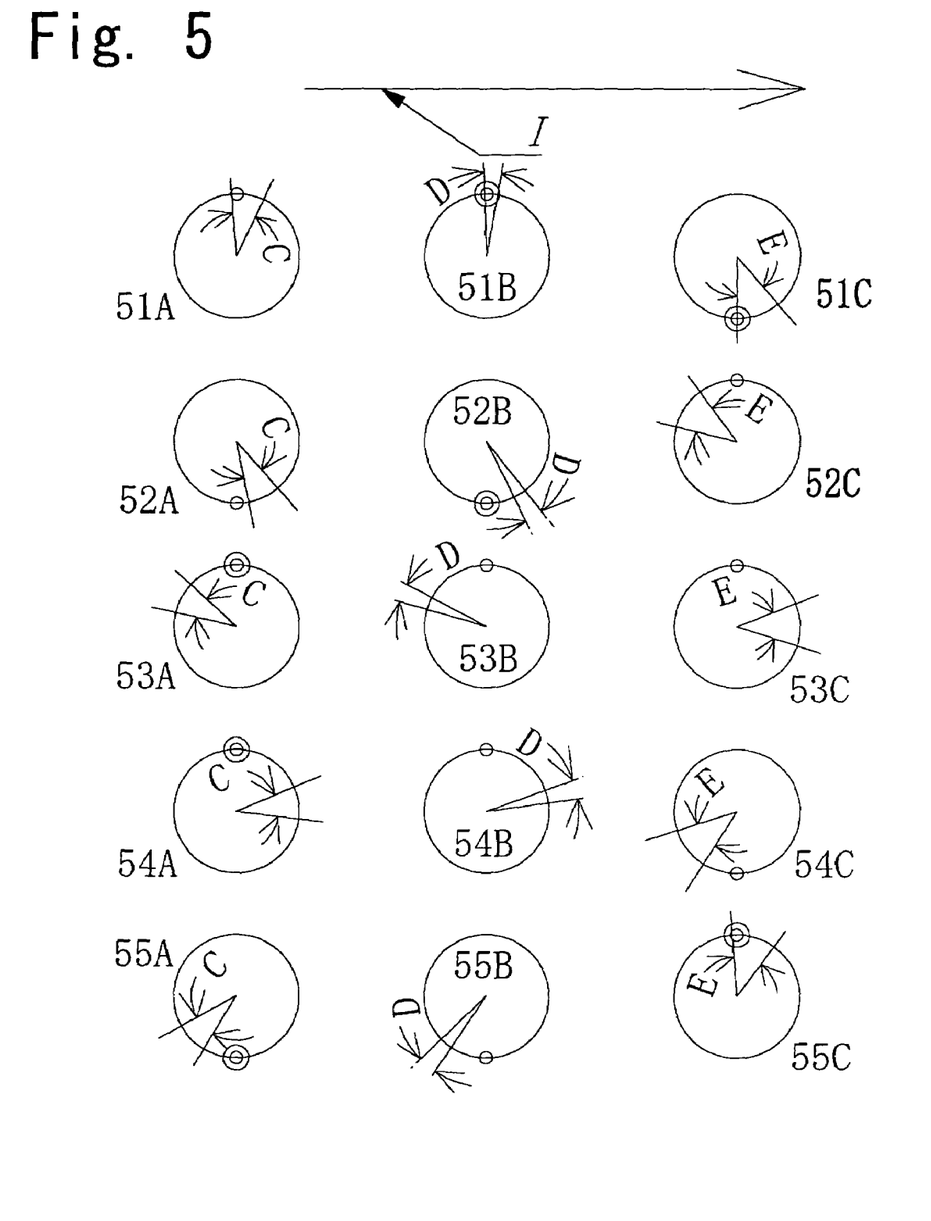
FIG. 5 shows a four-cycle five-cylinder engine.
Figure 7:
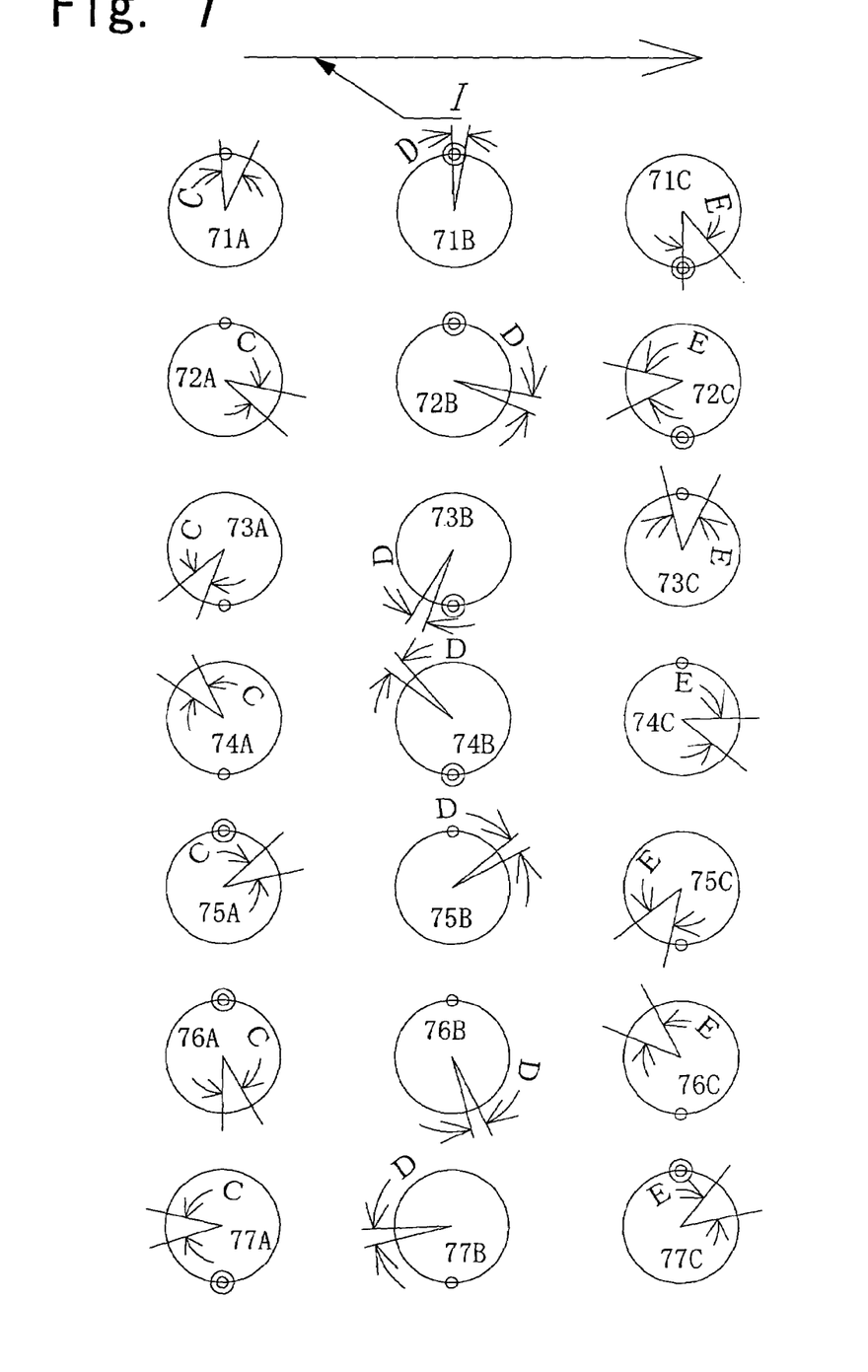
FIG. 7 shows a four-cycle seven-cylinder engine.

Likewise, in a five-cylinder engine, as shown in FIG. 5, the fourth cylinder is in the middle period in an intake stroke 54B. In a seven-cylinder engine, as shown in FIG. 7, the fifth cylinder is in the middle period in an intake stroke 75B, while the sixth cylinder is in the last period in an intake stroke 76B. FIGS. 5 and 7 show that there is no cylinder in which the initial period in an intake stroke overlaps with a combustion stroke. This is also the case with an engine having another odd number of cylinders.

In Embodiments 1 to 5, the phases A and B are set at different periods. Accordingly, if two or more of Embodiments 1 to 5 are used at the same time, it is an effective means to vary the ratio between the lengths of time of the phases A and B or shift the phases.

Embodiment 2

Each exhaust stroke in each cylinder has a period extending from the valve-opening time to a point near the bottom dead center of this stroke. This period is set within one of the periods indicated with the widely spaced lines in FIG. 2.

This embodiment is exemplified by a four-cycle four-cylinder engine with reference to FIG. 4.

Each of the periods indicated with the widely spaced lines is equivalent to a crank angle of about 90 degrees.

It is assumed that the exhaust valve for each cylinder opens at 40 degrees before the bottom dead center of each exhaust stroke. Under this assumption, this embodiment is very effective if the end point F of each generating phase B is a point of 20 degrees before the bottom dead center of each exhaust stroke. The point of 20 degrees is in a period E of 41C in FIG. 4. The end point F of each generating phase B can be selected from the period equivalent to the crank angle from 85 degrees before the bottom dead center of each exhaust stroke to 45 degrees after this center, and from the periods equivalent to the crank angles shifted 180 degrees from it.

This embodiment can be applied to spark ignition engines and compression ignition engines if they are four-cycle engines having pistons.

Function of Embodiment 2

The foregoing setting decreases the rotational speed of the crankshaft as power generation progresses. This decreases the piston speed, consequently lengthening the period from the exhaust valve opening time to the bottom dead center of each exhaust stroke. This, in turn, reduces the pressure in the cylinder working at the bottom dead center, as compared with the conventional engine. As a result, the exhaust loss caused when the piston is lifted after reaching the bottom dead center decreases.

Additional Description of Embodiment 2

In a two-cylinder engine, the combustion in the cylinder working in a combustion stroke quickly accelerates the piston in an exhaust stroke, near the bottom dead center of an expansion stroke.

In a three-cylinder engine, as shown at 32B in FIG. 3, the combustion in the cylinder working in a combustion stroke quickly accelerates the piston in an exhaust stroke, at about 50 degrees after the bottom dead center of an expansion stroke.

In a four-cylinder engine, as shown at 42B in FIG. 4, the combustion in the cylinder working in a combustion stroke quickly accelerates the piston in an exhaust stroke, near the bottom dead center of an expansion stroke.

In a five-cylinder engine, as shown at 52B in FIG. 5, the combustion in the cylinder working in a combustion stroke quickly accelerates the piston in an exhaust stroke, at about 154 degrees after the top dead center of a compression stroke.

Figure 6:
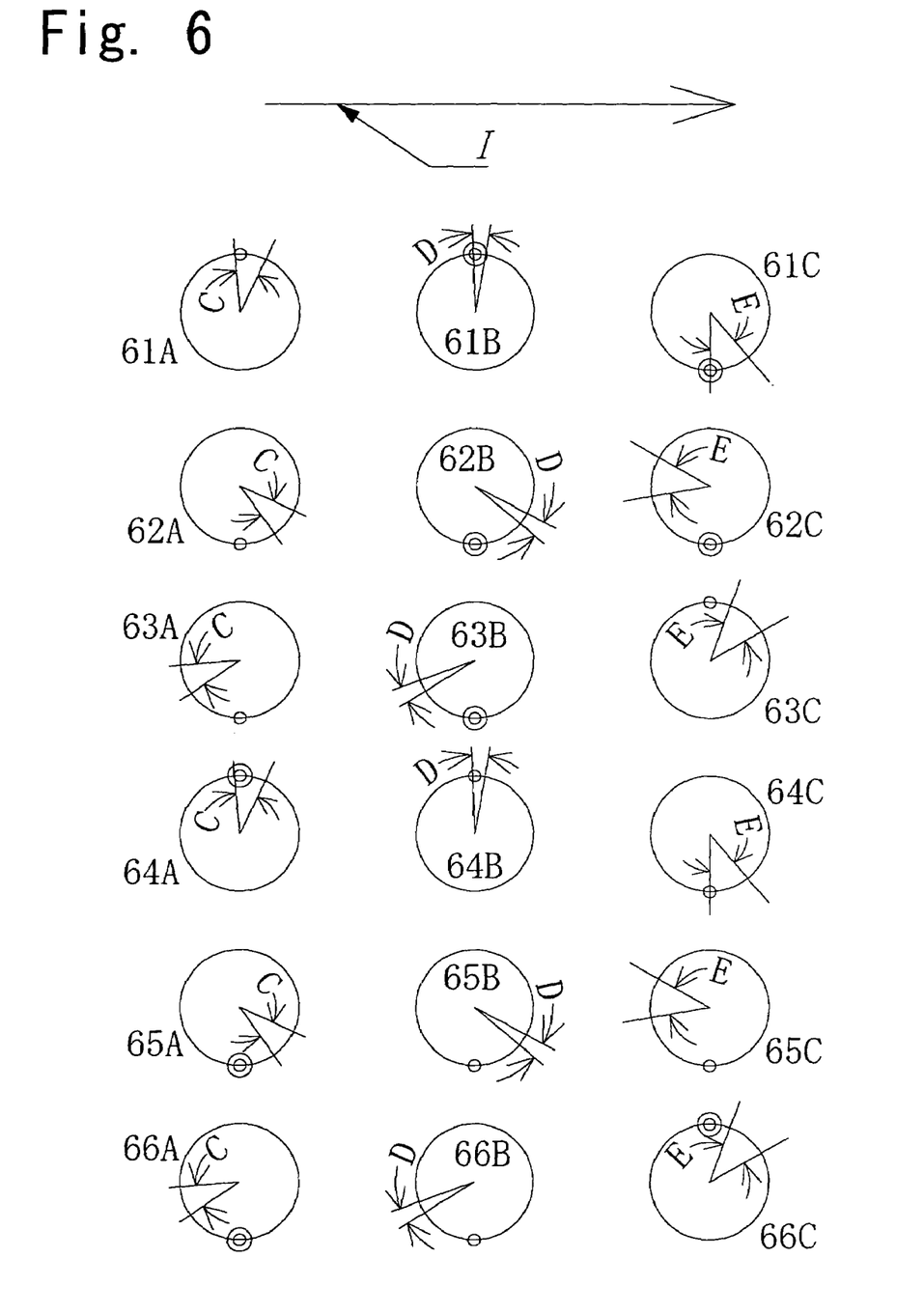
FIG. 6 shows a four-cycle six-cylinder engine.

In a six-cylinder engine, as shown at 62B in FIG. 6, the combustion in the cylinder working in a combustion stroke quickly accelerates the piston in an exhaust stroke, at about 130 degrees after the top dead center of a compression stroke.

In a seven-cylinder engine, as shown at 72B in FIG. 7, the combustion in the cylinder working in a combustion stroke quickly accelerates the piston in an exhaust stroke, at about 113 degrees after the top dead center of a compression stroke.

Figure 8:
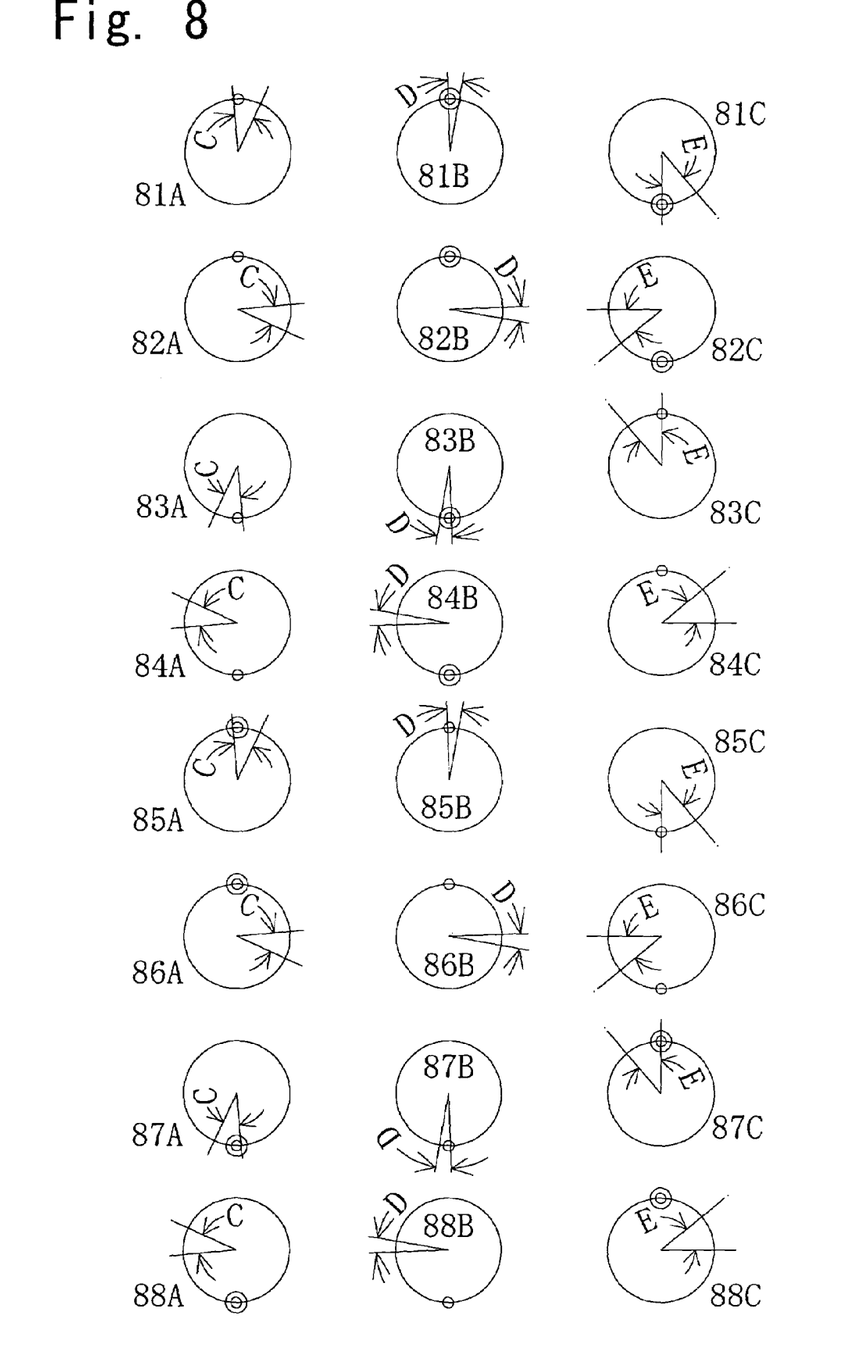
FIG. 8 shows a four-cycle eight-cylinder engine.

In an eight-cylinder engine, as shown at 82B and 83B in FIG. 8, the combustion in the cylinders each working in a combustion stroke quickly accelerates the pistons each in an exhaust stroke, at about 100 and about 190 degrees after the top dead center of a compression stroke.

In a nine-cylinder engine, the combustion in the cylinders each working in a combustion stroke quickly accelerates the pistons each in an exhaust stroke, at about 90 and about 170 degrees after the top dead center of a compression stroke.

Accordingly, the effects of this embodiment are restricted for five-cylinder and nine-cylinder engines, and slightly restricted for two-cylinder and four-cylinder engines.

Embodiment 3

The period for each combustion stroke is set within one of the periods indicated with the widely spaced lines in FIG. 2.

This embodiment can be applied to four-cycle and two-cycle engines of the spark ignition and compression ignition types. The number of cylinders does not restrict the effects of this embodiment.

The foregoing setting reduces the rotational speed of the crankshaft in the combustion strokes, consequently decelerating the pistons moving downward. This, in turn, reduces the factors for lowering the combustion pressure while each piston is moving downward. As a result, the pressure in the cylinder working in a combustion stroke increases as compared with the conventional engine.

This embodiment cannot be applied under high loads, under which the combustion speed may be too high, so that knocking is liable to occur. Accordingly, this embodiment is effective under normal and low loads.

Embodiment 4

The period from opening the exhaust port of each cylinder of a two-cycle engine to opening the associated scavenging port is set within one of the periods indicated with the widely spaced lines in FIG. 2.

This embodiment can be applied to spark ignition engines and compression ignition engines.

Figure 9:
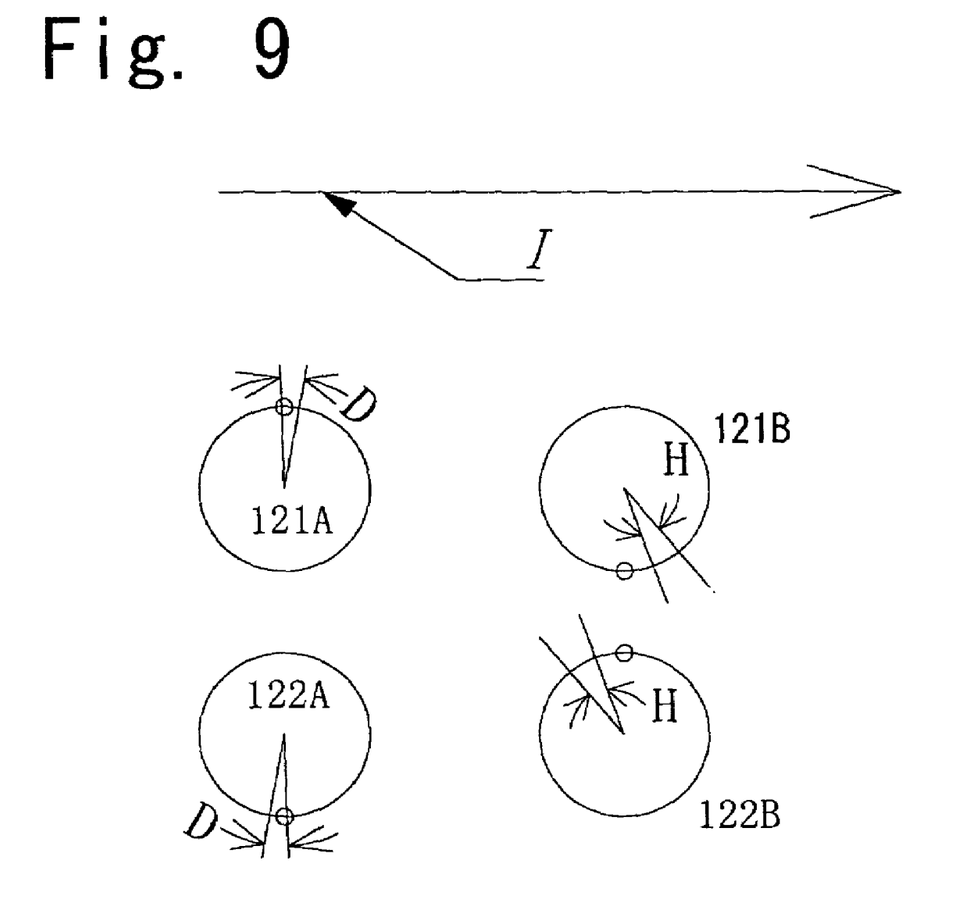
FIG. 9 shows the two-cycle two-cylinder engine in Embodiment 4; the left row A of cylinders represents a combustion stroke in which the first cylinder works and a stroke in which the second cylinder works at the same time; the right row B of cylinders represents a scavenging stroke in which the first cylinder works and a stroke in which the second cylinder works at the same time.

This embodiment is exemplified by a two-cycle two-cylinder engine with reference to FIG. 9.

The small circles at 0 o'clock in FIG. 9 indicate top dead centers.

The small circles at 6 o'clock in FIG. 9 indicate bottom dead centers.

Each of the periods indicated with the widely spaced lines in FIG. 2 is equivalent to a crank angle of about 180 degrees.

This embodiment is very effective if the end point F of each generating phase B is intermediate between the exhaust port opening time and the scavenging port opening time. The end point F can be selected from the period equivalent to the crank angle from 90 degrees before the exhaust port opening time to 90 degrees after this opening time, and from the periods equivalent to the crank angles shifted 180 degrees from it.

The first cylinder 121A working in a combustion stroke accelerates the second cylinder 122A working at the same time for a period D in the scavenging stroke just after the bottom dead center of the combustion stroke, but does not accelerate the second cylinder 122A working for a period H in the exhaust stroke just before this bottom dead center.

Figure 10:
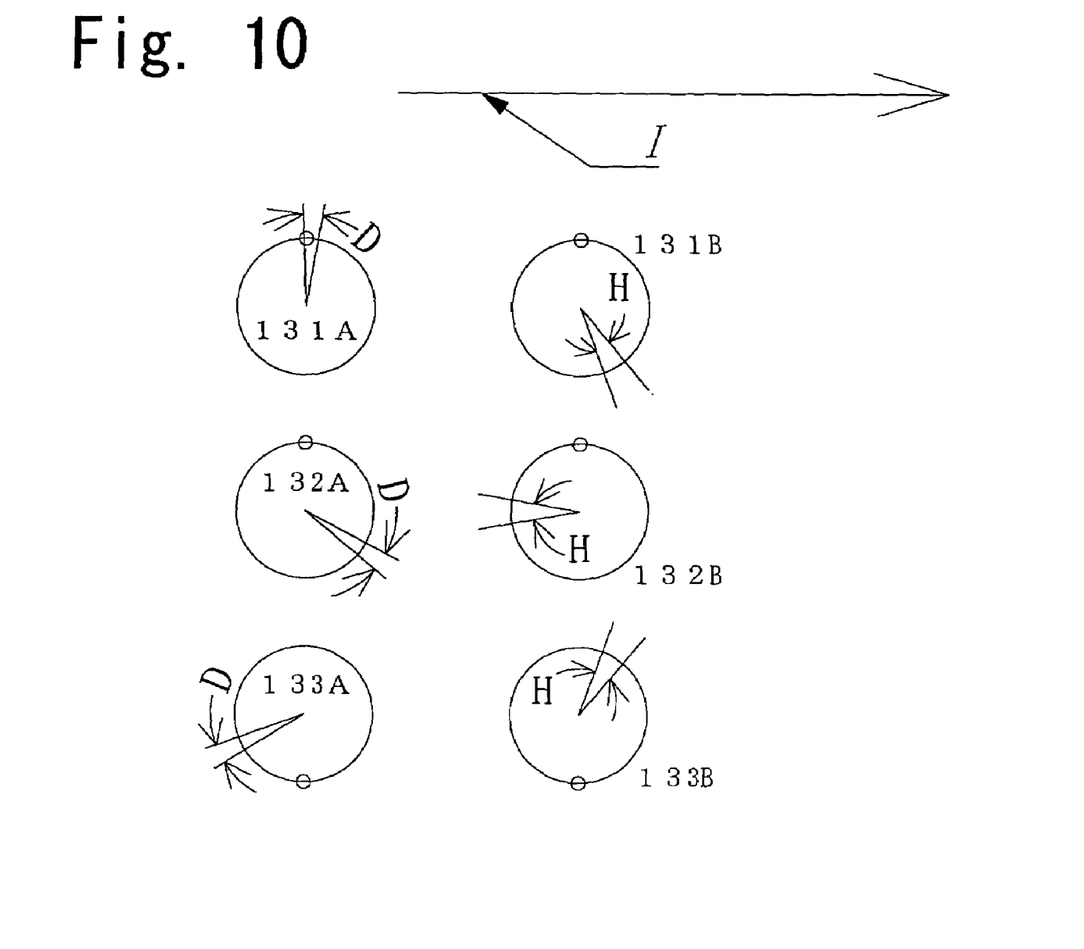
FIG. 10 shows a two-cycle three-cylinder engine.

This embodiment is also exemplified by a two-cycle three-cylinder engine with reference to FIG. 10.

At the same time that the first cylinder of this engine works for a period D in a combustion stroke 131 Å, the second cylinder of the engine works for a period D near the start point of the exhaust stroke 132A before the bottom dead center of the combustion stroke. Accordingly, a three-cylinder engine restricts the effect of this embodiment.

Function and Effect of Embodiment 4

The foregoing setting increases the time from opening an exhaust port to opening a scavenging port, as compared with the conventional engine. This lowers the pressure in the cylinder starting to work in a scavenging stroke, as compared with the conventional engine.

Embodiment 5

Each of the periods when combustion continues under high loads in a four-cycle spark ignition engine is set within one of the periods indicated with the narrowly spaced lines in FIG. 2.

This embodiment is exemplified by a four-cycle four-cylinder engine.

This embodiment is very effective if the end point G of each driving phase A is in a period D in FIG. 4 when combustion continues. The end point G can be selected from the period equivalent to the crank angle from 40 degrees before the top dead center of a compression stroke to 50 degrees after this center.

This embodiment is applied under high loads and contrary to Embodiment 3, which is applied under normal and low loads.

Function and Effect of Embodiment 5

The foregoing setting makes it possible to increase the rotational speed of the crankshaft in each combustion stroke. This increases the speed at which the volume of each combustion chamber increases. This, in turn, increases the factors for reducing the pressure in each combustion chamber. As a result, knocking is not liable to occur.

The knocking resistance is improved when the number of revolutions per minute is small in comparison with the conventional engine.

The effect of this embodiment is not restricted by the number of cylinders.

What is claimed is:

1. A method for operating a hybrid engine including an internal combustion engine, the internal combustion engine further having an output shaft, the hybrid engine further including an electric motor having an output shaft connected mechanically to the output shaft of the internal combustion engine, the motor being able to be switched electrically between a driving operation mode in which the motor drives the internal combustion engine and a generating operation mode in which the motor generates electric power, the hybrid engine being fitted with a crank angle sensor for sensing the crank angle of the internal combustion engine, the hybrid engine being further fitted with a computer for controlling the electric switching of the motor according to information from the crank angle sensor, the method comprising the steps of:
    so controlling the motor that the computer creates at least one driving phase and at least one generating phase according to a prepared program and the information from the crank angle sensor during the period from an ignition time to the next ignition time, the driving and generating phases pairing with each other; and
    so controlling the motor by means of the computer as to keep operating alternately in the driving and generating operation modes during the driving and generating phases, respectively.

2. The method of claim 1, wherein the internal combustion engine is a four-cycle engine having intake, compression, expansion and exhaust strokes, the intake strokes each having an initial period that starts at the associated valve-opening time and extends while the associated valve lift is small, the driving phase consisting of a first period and a second period succeeding the first period, the generating phase consisting of a first period and a second period succeeding the first period of the generating phase, and wherein the acceleration effect in the second period of the driving phase does not influence the second period of the generating phase, and wherein the deceleration effect in the second period of the generating phase influences the first period of the driving phase;
    the method further comprising the step of setting the initial period in one of the intake strokes within the period consisting of the second period of the generating phase and the first period of the succeeding driving phase by means of the computer according to the prepared program and the information from the crank angle sensor.

3. The method of claim 1, wherein the internal combustion engine is a four-cycle engine having intake, compression, expansion and exhaust strokes, the exhaust strokes each having an initial period from a point near the associated valve-opening time to a point near the associated bottom dead center, the driving phase consisting of a first period and a second period succeeding the first period, the generating phase consisting of a first period and a second period succeeding the first period of the generating phase, and wherein the acceleration effect in the second period of the driving phase does not influence the second period of the generating phase, and wherein the deceleration effect in the second period of the generating phase influences the first period of the driving phase;
    the method further comprising the step of setting the initial period in one of the exhaust strokes within the period consisting of the second period of the generating phase and the first period of the succeeding driving phase by means of the computer according to the prepared program and the information from the crank angle sensor.

4. The method of claim 1, wherein the internal combustion engine continues combustion for a combustion period, the driving phase consisting of a first period and a second period succeeding the first period, the generating phase consisting of a first period and a second period succeeding the first period of the generating phase, and wherein the acceleration effect in the second period of the driving phase does not influence the second period of the generating phase, and wherein the deceleration effect in the second period of the generating phase influences the first period of the driving phase;
    the method further comprising the step of setting the combustion period within the period consisting of the second period of the generating phase and the first period of the succeeding driving phase by means of the computer according to the prepared program and the information from the crank angle sensor.

5. The method of claim 1, wherein the internal combustion engine is a two-cycle engine having an exhaust port and a scavenging port, the driving phase consisting of a first period and a second period succeeding the first period, the generating phase consisting of a first period and a second period succeeding the first period of the generating phase, and wherein the acceleration effect in the second period of the driving phase does not influence the second period of the generating phase, and wherein the deceleration effect in the second period of the generating phase influences the first period of the driving phase;
    the method further comprising the step of setting, within the period consisting of the second period of the generating phase and the first period of the succeeding driving phase by means of the computer according to the prepared program and the information from the crank angle sensor, the period from the time when the exhaust port opens to the time when the scavenging port opens.

6. The method of claim 1, wherein the internal combustion engine continues combustion for a combustion period, the driving phase consisting of a first period and a second period succeeding the first period, the generating phase consisting of a first period and a second period succeeding the first period of the generating phase, and wherein the deceleration effect in the second period of the generating phase does not influence the second period of the driving phase, and wherein the acceleration effect in the second period of the driving phase influences the first period of the generating phase, the method further comprising the step of setting the combustion period within the period consisting of the second period of the driving phase and the first period of the succeeding generating phase by means of the computer according to the prepared program and the information from the crank angle sensor.

7. The method of claim 2, wherein the internal combustion engine has an odd number of cylinders.

8. The method of claim 1, wherein the internal combustion engine has intake, compression, expansion and exhaust strokes, the driving phase consisting of a first period and a second period succeeding the first period, the generating phase consisting of a first period and a second period succeeding the first period of the generating phase, and wherein the acceleration effect in the second period of the driving phase does not influence the second period of the generating phase, and wherein the deceleration effect in the second period of the generating phase influences the first period of the driving phase;

the method further comprising the step of setting the length of time for a portion of one of the piston strokes within the period consisting of the second period of the generating phase and the first period of the succeeding driving phase by means of the computer if a trouble occurs because the length of time is short.

9. The method of claim 1, wherein the internal combustion engine has intake, compression, expansion and exhaust strokes, the driving phase consisting of a first period and a second period succeeding the first period, the generating phase consisting of a first period and a second period succeeding the first period of the generating phase, and wherein the deceleration effect in the second period of the generating phase does not influence the second period of the driving phase, and wherein the acceleration effect in the second period of the driving phase influences the first period of the generating phase, and the method further comprising the step of setting the length of time for a portion of one of the piston strokes within the period consisting of the second period of the driving phase and the first period of the succeeding generating phase by means of the computer if a trouble occurs because the length of time is long.

10. The method of claim 3, wherein the internal combustion engine has three, seven or an even number of cylinders.

11. The method of claim 1, wherein the driving phase differs in length of time from the generating phase.

* * * * *